US012587369B2

(12) United States Patent
Amer et al.

(10) Patent No.: US 12,587,369 B2
(45) Date of Patent: Mar. 24, 2026

(54) SYSTEMS AND METHODS FOR BRIDGING GAPS IN CRYPTOGRAPHIC SECRET DISTRIBUTION USING LINE-OF-SIGHT-SECURED NETWORKS

(71) Applicant: JPMORGAN CHASE BANK, N.A., New York, NY (US)

(72) Inventors: Omar Amer, New York, NY (US); Charles Lim, Singapore (SG); Marco Pistoia, Amawalk, NY (US); Andrew Lang, Avon, CT (US); Vas Rajan, New York, NY (US); Kaushik Chakraborty, Singapore (SG); Saqib Malik, Colonia, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 171 days.

(21) Appl. No.: 18/305,039

(22) Filed: Apr. 21, 2023

(65) Prior Publication Data

US 2024/0356738 A1     Oct. 24, 2024

(51) Int. Cl.
*H04L 29/06* (2006.01)
*H04L 9/08* (2006.01)

(52) U.S. Cl.
CPC ............ *H04L 9/0827* (2013.01); *H04L 9/085* (2013.01); *H04L 9/0858* (2013.01)

(58) Field of Classification Search
None
See application file for complete search history.

(56) References Cited

U.S. PATENT DOCUMENTS 7,577,257 B2 * 8/2009 Xia ..................... H04B 7/18595
                                                380/278
8,374,350 B2 * 2/2013 Yuan ...................... H04B 10/70
                                                380/278
(Continued)

FOREIGN PATENT DOCUMENTS

EP          3742664        11/2020
WO       2021090026         5/2021
WO       2022162390         4/2022

OTHER PUBLICATIONS

International Search Report and Written Opinion of the International Searching Authority, dated Jul. 1, 2024, from corresponding International Application No. PCT/US2024/024584.

*Primary Examiner* — Maung T Lwin
(74) *Attorney, Agent, or Firm* — GREENBERG TRAURIG LLP

(57) ABSTRACT

Systems and methods for bridging gaps in cryptographic secret distribution using line-of-sight-secured networks are disclosed. In one embodiment, a system may include: a first physical location providing a cryptographic secret; a second physical location comprising a space-based vehicle transceiver that receives the cryptographic secret from the first physical location over a secure communication channel; a space-based vehicle that receives the cryptographic secret from the second physical location over a first line-of-sight communication channel; and a third physical location that receives the cryptographic secret from the space-based vehicle over a second line-of-sight communication channel, encrypts data with the cryptographic secret, and communicates the encrypted data to the first physical location over a communication network; wherein the first physical location receives the encrypted data and decrypts the encrypted data using the cryptographic secret.

12 Claims, 3 Drawing Sheets

(56) References Cited

U.S. PATENT DOCUMENTS

| | | | | |
|---|---|---|---|---|
| 9,509,506 | B2* | 11/2016 | Hughes | H04L 9/3247 |
| 10,574,446 | B2* | 2/2020 | Fu | H04L 9/0852 |
| 11,537,728 | B1* | 12/2022 | Esbensen | H04L 9/0819 |
| 11,856,094 | B2* | 12/2023 | Durak | H04B 10/1129 |
| 11,979,195 | B2* | 5/2024 | Isaacson | G06N 10/00 |
| 12,362,913 | B2* | 7/2025 | D'Souza | H04L 9/0852 |
| 2013/0083926 | A1* | 4/2013 | Hughes | H04L 9/3247 |
| | | | | 380/278 |
| 2020/0050959 | A1* | 2/2020 | Ashrafi | H04L 9/085 |
| 2022/0094442 | A1* | 3/2022 | Isaacson | H04L 9/0855 |
| 2022/0166610 | A1* | 5/2022 | Rahman | H04L 43/0811 |
| 2022/0166613 | A1* | 5/2022 | Cruz | G09C 5/00 |
| 2022/0223056 | A1* | 7/2022 | Dupray | G08G 5/21 |
| 2022/0294618 | A1* | 9/2022 | Lord | H04L 9/0855 |
| 2022/0393865 | A1* | 12/2022 | Williams | H04B 10/118 |
| 2022/0393866 | A1* | 12/2022 | Williams | H04B 7/18508 |
| 2023/0006719 | A1* | 1/2023 | Ashrafi | H04B 7/0413 |
| 2023/0171093 | A1* | 6/2023 | Cummings | G06N 10/40 |
| | | | | 380/255 |
| 2023/0188335 | A1* | 6/2023 | Lamas Linares | H04L 63/0428 |
| | | | | 713/168 |
| 2023/0254135 | A1* | 8/2023 | Lyons | H04B 10/118 |
| | | | | 380/256 |
| 2024/0049122 | A1* | 2/2024 | Huda | H04W 48/18 |
| 2024/0113869 | A1* | 4/2024 | Trost | H04L 9/0852 |

* cited by examiner

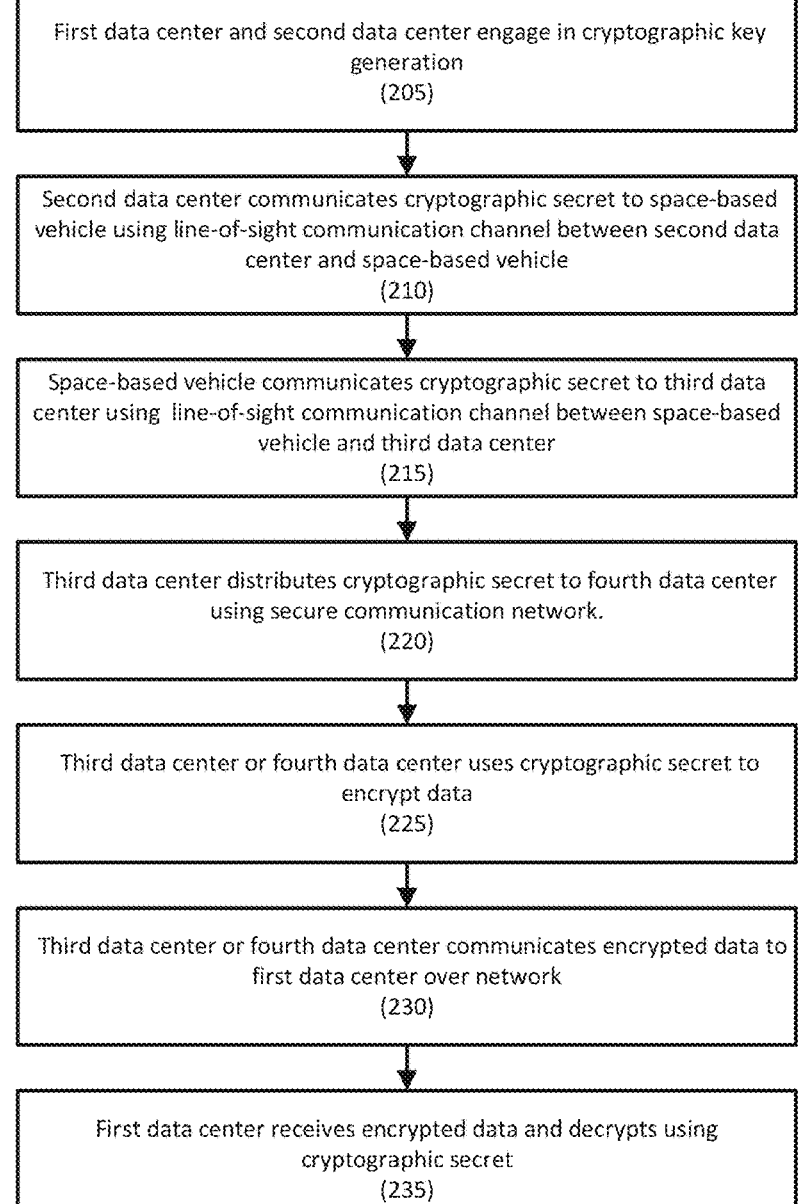

First data center and second data center engage in cryptographic key generation
(205)

Second data center communicates cryptographic secret to space-based vehicle using line-of-sight communication channel between second data center and space-based vehicle
(210)

Space-based vehicle communicates cryptographic secret to third data center using line-of-sight communication channel between space-based vehicle and third data center
(215)

Third data center distributes cryptographic secret to fourth data center using secure communication network.
(220)

Third data center or fourth data center uses cryptographic secret to encrypt data
(225)

Third data center or fourth data center communicates encrypted data to first data center over network
(230)

First data center receives encrypted data and decrypts using cryptographic secret
(235)

FIGURE 2

Computing Device 300

Memory(ies) 310

Processor(s) 305

Data Repository 320

Software Programs 315

330

Network Interface Connector 340

Wired Interface 342

Wireless Interface 344

SYSTEMS AND METHODS FOR BRIDGING GAPS IN CRYPTOGRAPHIC SECRET DISTRIBUTION USING LINE-OF-SIGHT-SECURED NETWORKS

BACKGROUND OF THE INVENTION

1. Field of the Invention

Embodiments relate to systems and methods for bridging gaps in cryptographic secret distribution using line-of-sight-secured networks.

2. Description of the Related Art

Cryptographic secret distribution protocols, such as quantum key distribution (QKD) protocols, enable remote parties with access to an untrusted quantum channel as well as a public and authenticated classical channel to establish a secret key without the need for the use of computational assumptions, a feat that is not possible if limited to only classical information. QKD protocols can be shown to be provably secure against (quantum) computationally unbounded attackers based on the principles of quantum mechanics and information theory, making them an important cryptographic tool in light of advances in cryptanalysis fueled by quantum computing.

To achieve these advantages over classical protocols, QKD protocols naturally make use of quantum communication as a central resource, most commonly realizing this capability through fiber connections between endpoints. The use of fiber as a medium makes QKD naturally suited towards deployment in certain high-capacity communication infrastructure, such as between physical locations, such as data centers, buildings, branches, homes, etc. with dedicated fiber links between them, but it can also result in some limitations. For example, the need for a quantum channel (e.g., fiber connectivity) between connected parties limits the practicality of establishing QKD keys directly with an end-user, who likely is not connected to QKD network or potentially even a fiber network.

SUMMARY OF THE INVENTION

Systems and methods for bridging gaps in cryptographic secret distribution using line-of-sight-secured networks are disclosed. In one embodiment, a system may include: a first physical location providing a cryptographic secret; a second physical location comprising a space-based vehicle transceiver that receives the cryptographic secret from the first physical location over a secure communication channel; a space-based vehicle that receives the cryptographic secret from the second physical location over a first line-of-sight communication channel; and a third physical location that receives the cryptographic secret from the space-based vehicle over a second line-of-sight communication channel, encrypts data with the cryptographic secret, and communicates the encrypted data to the first physical location over a communication network; wherein the first physical location receives the encrypted data and decrypts the encrypted data using the cryptographic secret.

In one embodiment, the first physical location may include a webserver.

In one embodiment, the first physical location may include a data source.

In one embodiment, the first physical location and the second physical location may distill the cryptographic secret using a quantum key distribution protocol, and the cryptographic secret may include a quantum key.

In one embodiment, the third physical location may communicate the encrypted data to the first physical location using symmetric or asymmetric encryption.

In one embodiment, the third physical location may communicate the encrypted data to the first physical location over a Transport Layer Security or an Internet Protocol Security tunnel.

In one embodiment, the first line-of-sight communication channel and the second line-of-sight communication channel may include Super High Frequency or Extremely High Frequency (EHF) bands.

In one embodiment, the secure communication channel may include a direct fiber optic link.

In one embodiment, the space-based vehicle may include a satellite, a high altitude platform system, a high altitude pseudo satellite, an atmospheric satellite, or a spaceship.

According to another embodiment, a method may include: (1) a first physical location providing a cryptographic secret to a second physical location over a secure communication channel, wherein the second physical location comprises a space-based vehicle transceiver and is configured to communicate the cryptographic secret to a space-based vehicle over a first line-of-sight communication channel, wherein the space-based vehicle is configured to receive the cryptographic secret from the space-based vehicle over a second line-of-sight communication channel and communicate the cryptographic secret to a third physical location over a second line-of-sight communication channel, wherein the third physical location is configured to encrypt data with the cryptographic secret; (2) receiving, by the first physical location, the encrypted data from the third physical location over a communication network; and (3) decrypting, by the first physical location, the encrypted data using the cryptographic secret.

In one embodiment, the first physical location may include a webserver.

In one embodiment, the first physical location may include a data source.

In one embodiment, the first physical location and the second physical location may distill the cryptographic secret using a quantum key distribution protocol, and the cryptographic secret may include a quantum key.

In one embodiment, the third physical location may communicate the encrypted data to the first physical location using symmetric or asymmetric encryption.

In one embodiment, the third physical location may communicate the encrypted data to the first physical location over a Transport Layer Security or an Internet Protocol Security tunnel.

In one embodiment, the first line-of-sight communication channel and the second line-of-sight communication channel may include Super High Frequency or Extremely High Frequency (EHF) bands.

In one embodiment, the secure communication channel may include a direct fiber optic link.

In one embodiment, the space-based vehicle may include a satellite, a high altitude platform system, a high altitude pseudo satellite, an atmospheric satellite, or a spaceship.

According to another embodiment, a non-transitory computer readable storage medium, may include instructions stored thereon, which when read and executed by one or more computer processors at a first physical location, cause the one or more computer processors to perform steps comprising: providing a cryptographic secret to a second physical location over a secure communication channel, wherein the second physical location comprises a space-based vehicle transceiver and is configured to communicate the cryptographic secret to a space-based vehicle over a first line-of-sight communication channel, wherein the space-based vehicle is configured to receive the cryptographic secret from the space-based vehicle over a second line-of-sight communication channel and communicate the cryptographic secret to a third physical location over a second line-of-sight communication channel, wherein the third physical location is configured to encrypt data with the cryptographic secret; receiving the encrypted data from the third physical location over a communication network; and decrypting the encrypted data using the cryptographic secret.

In one embodiment, the third physical location may be configured to communicate the encrypted data to the first physical location using symmetric or asymmetric encryption or over a Transport Layer Security or an Internet Protocol Security tunnel.

In one embodiment, the space-based vehicle may include a satellite, a high altitude platform system, a high altitude pseudo satellite, an atmospheric satellite, or a spaceship.

BRIEF DESCRIPTION OF THE DRAWINGS

For a more complete understanding of the present invention, the objects and advantages thereof, reference is now made to the following descriptions taken in connection with the accompanying drawings in which:

FIG. 2 illustrates a method for bridging gaps in cryptographic secret distribution using line-of-sight-secured networks according to an embodiment;

DETAILED DESCRIPTION OF PREFERRED EMBODIMENTS

Embodiments relate to systems and methods for bridging gaps in cryptographic secret distribution using line-of-sight-secured networks.

The disclosure of U.S. patent application Ser. No. 18/174,768, filed Feb. 27, 2023 is hereby incorporated, by reference, in its entirety.

Embodiments may leverage the physical security provided by line-of-sight communication channels, such as those between ground stations and space-based vehicles, such as satellites, high altitude platform systems, high altitude pseudo satellites, atmospheric satellites, spaceships, etc., between space-based vehicles, etc. to securely exchange cryptographic secrets, such as cryptographic keys, between ground stations that may not have a secure connection. An example, embodiments may securely communicate quantum keys from one ground station to another via one or more space-based vehicles with each ground station may have line-of-sight communication. The cryptographic secrets may then be distributed within secure networks (e.g., line-of-sight networks, direct fiber networks, etc.). Thus, rather than deploy secure space-based vehicles with specific cryptographic capabilities (e.g., QKD-enabled space-based vehicles), classical space-based vehicles may be used to link distant stations and bridge otherwise disconnected segments. Security may be provided through a mixture of classical cryptographic tools and the directional communication between the space-based vehicle and ground-stations.

Classical space-based signals, such as satellite signals, are much less sensitive to environmental factors than certain cryptographic communications (e.g., QKD-enabled communications), and the line-of-sight channel security allows the link to maintain eavesdropper resistance. For example, classical satellites often employ tracking and pointing technologies to achieve the best possible transmission bandwidth and fidelity. In addition, airspace is typically rigorously monitored, which provides assurance that no unauthorized objects are near the line-of-sight channel. This allows the users of such communication channels to quickly identify adversarial situations and abort the communications and associated secrets if any eavesdropping attempt is discovered.

In embodiments, in order to secure against possible corruption or failures of the satellite links, secret sharing or secure message transmission schemes, homomorphic encryption, and other trusted node-hardening techniques may be used to reduce the trust on the satellite or terrestrial trusted nodes.

Figure 1:
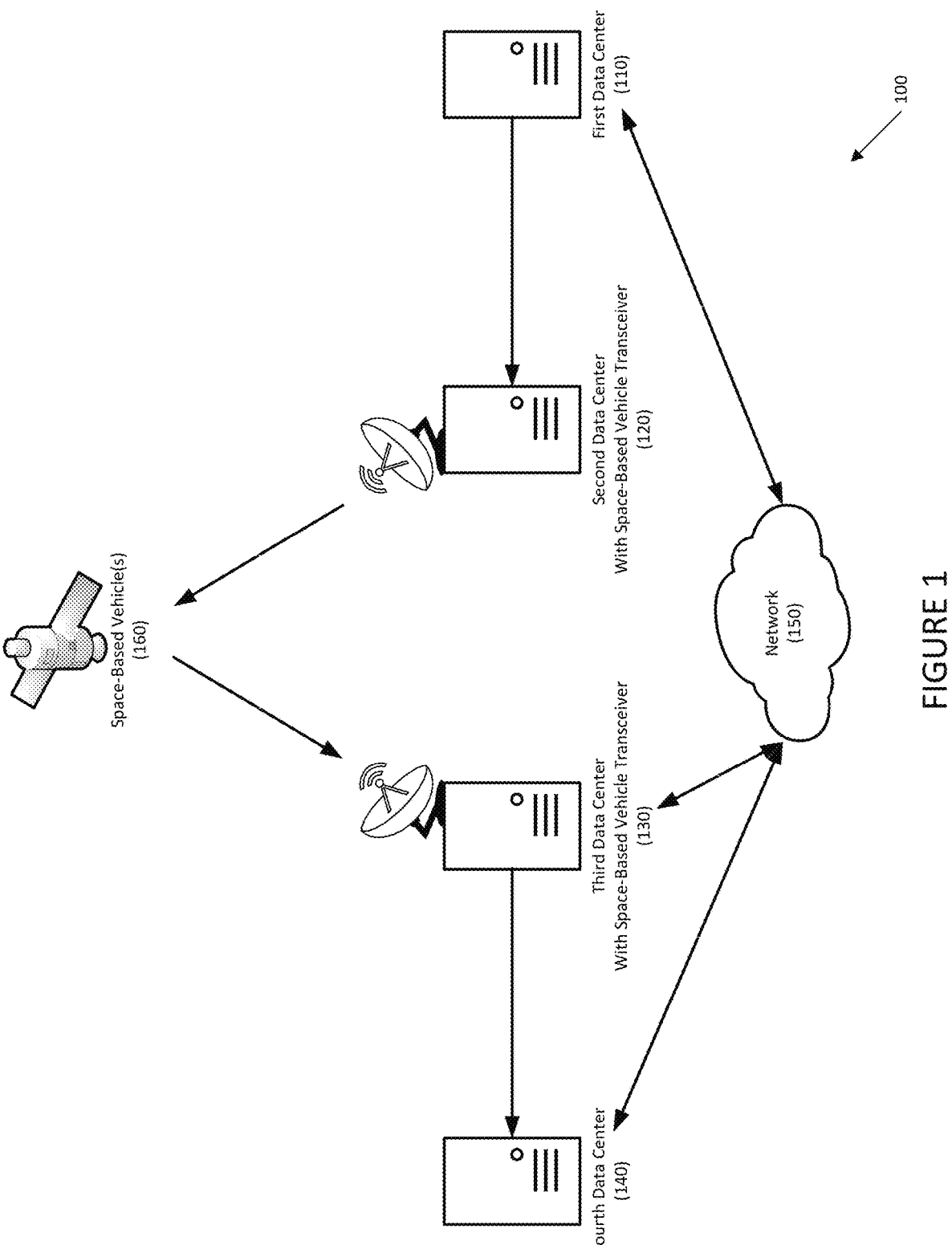
FIG. 1 illustrates a system for bridging gaps in cryptographic secret distribution using line-of-sight-secured networks according to an embodiment.

Referring to FIG. 1, a system for bridging gaps in cryptographic secret distribution using line-of-sight-secured networks is disclosed according to an embodiment. System 100 may include physical locations, such as first physical location 110, second physical location 120, third physical location 130, and fourth physical location 140. Examples of physical locations 110, 120, 130, and 140 may include data centers, buildings, branches, homes, etc.

Two of the physical locations, such as second physical location 120 and third physical location 130, may include space-based vehicle transceivers that enable physical locations 120 and 130 to communicate with one or more space-based vehicles 160, such as satellites, high altitude platform systems, high altitude pseudo satellites, atmospheric satellites, spaceships, etc. In one embodiment, physical locations 120 and 130 may communicate with space-based vehicle(s) 160 using any suitable communication manner, for example, by transmitting radio waves in the Super High Frequency (SHF) or Extremely High Frequency (EHF) bands. In general, physical location 120 and 130 need to have line-of-sight with space-based vehicle(s) 160.

Although only one space-based vehicle 160 is depicted in FIG. 1, it should be noted that more than one space-based vehicle 160 may be provided, and those space-based vehicles may communicate in any conventional manner, generally need to have line-of-sight with each other. It should also be recognized that space-based vehicles may include, for example, satellites, high altitude platform systems, high altitude pseudo satellites, atmospheric satellites, spaceships, etc.

First physical location 110 and second physical location 120 may communicate with each other using a secure communication channel, such as a direct fiber optic connection, a line-of-sight connection, etc. The secure communication may be provided using a QKD network including, for example, quantum devices (not shown). Any other security mechanism may be provided as is necessary and/or desired.

First physical location 110 may provide a cryptographic secret, such as cryptographic material, to second physical location 120 for communication to third physical location 130. In one embodiment, the cryptographic secret may include one or more quantum keys that are distilled by, for example, quantum devices (not shown). In another embodiment, first physical location 110 may securely communicate a cryptographic secret to second physical location 120.

Second physical location 120 and third physical location 130 may not have a secure communication channel, such as a direct fiber optic connection, a line-of-sight connection, etc. between them, and use space-based vehicle(s) 160 to provide a secure communication link.

After receiving the cryptographic secret, third physical location 130 may provide the cryptographic key to fourth physical location 140 using, for example, a secure communication channel (e.g., a direct fiber optic connection, a line-of-sight connection, etc.). In one embodiment, the secure communication channel may be a QKD-secured communication channel. Other types of secure communication channels may be used as is necessary and/or desired.

Third physical location 130 and/or fourth physical location 140 may then use the cryptographic secret to securely communicate with first physical location via network 150 using, for example, symmetric (e.g., one key is used to encrypt and decrypt) or asymmetric (e.g., different but mathematically-related keys are used to encrypt and decrypt) encryption. In one embodiment, the communication may be over a Transport Security Layer (TSL) tunnel, or an Internet Protocol Security (IPSec) tunnel, through network 150.

In one embodiment, first physical location 110 or second physical location 120 may include a webserver that provides the cryptographic secret, and third physical location 130 or fourth physical location 140 may use the cryptographic secret to communicate with the webserver, or may securely communicate the cryptographic secret to an end user electronic device (not shown) so that the end user electronic device may use the cryptographic secret to communicate with the webserver. Examples of secure distribution of the cryptographic secret to end user electronic devices are disclosed in U.S. patent application Ser. No. 18/304,892, the disclosure of which is hereby incorporated, by reference, in its entirety.

Referring to FIG. 2, a method for bridging gaps in cryptographic secret distribution using line-of-sight-secured networks is disclosed according to an embodiment.

In step 205, a first physical location and a second physical location may engage in cryptographic secret generation. For example, the first physical location and the second physical location may distill a quantum key using, for example, quantum devices. In another embodiment, the first physical location may securely communicate a cryptographic secret to the second physical location.

In one embodiment, the quantum key may be distilled using a quantum key protocol, such as BB84, E91, Device Independent Quantum Key Distribution, Twin Fields Quantum Key Distribution, etc.

In one embodiment, the first physical location and the second physical location may communicate over a secure communication channel, such as a direct fiber optic link, a line-of-sight link, etc.

In step 210, the second physical location may communicate the cryptographic secret to a space-based vehicle using a line-of-sight communication channel between the second physical location and the space-based vehicle. In one embodiment, the second physical location may communicate the cryptographic secret using any suitable communication method.

In step 215, the space-based vehicle may communicate the cryptographic secret to a third physical location using a line-of-sight communication channel between the space-based vehicle and the third physical location. In one embodiment, if the space-based vehicle does not have line-of-sight with the third physical location, the space-based vehicle may identify and communicate the cryptographic secret to another space-based vehicle that has line-of-sight with the third physical location, or to a series of space-based vehicles until one having line-of-sight with the third physical location is identified.

In step 220, the third physical location may optionally distribute the cryptographic secret to fourth physical location using a secure communication network. In one embodiment, the third physical location and the fourth physical location may communicate over a secure communication channel, such as a direct fiber optic link, a line-of-sight link, etc.

In step 225, the third physical location or the fourth physical location may encrypt data for the first physical location using the cryptographic secret(s), and, in step 230, may communicate the encrypted data to the first physical location using, for example, symmetric or asymmetric encryption over a network, such as the Internet.

In step 235, the first physical location may receive the encrypted data and may decrypt the encrypted data using the cryptographic secret(s).

Figure 3:
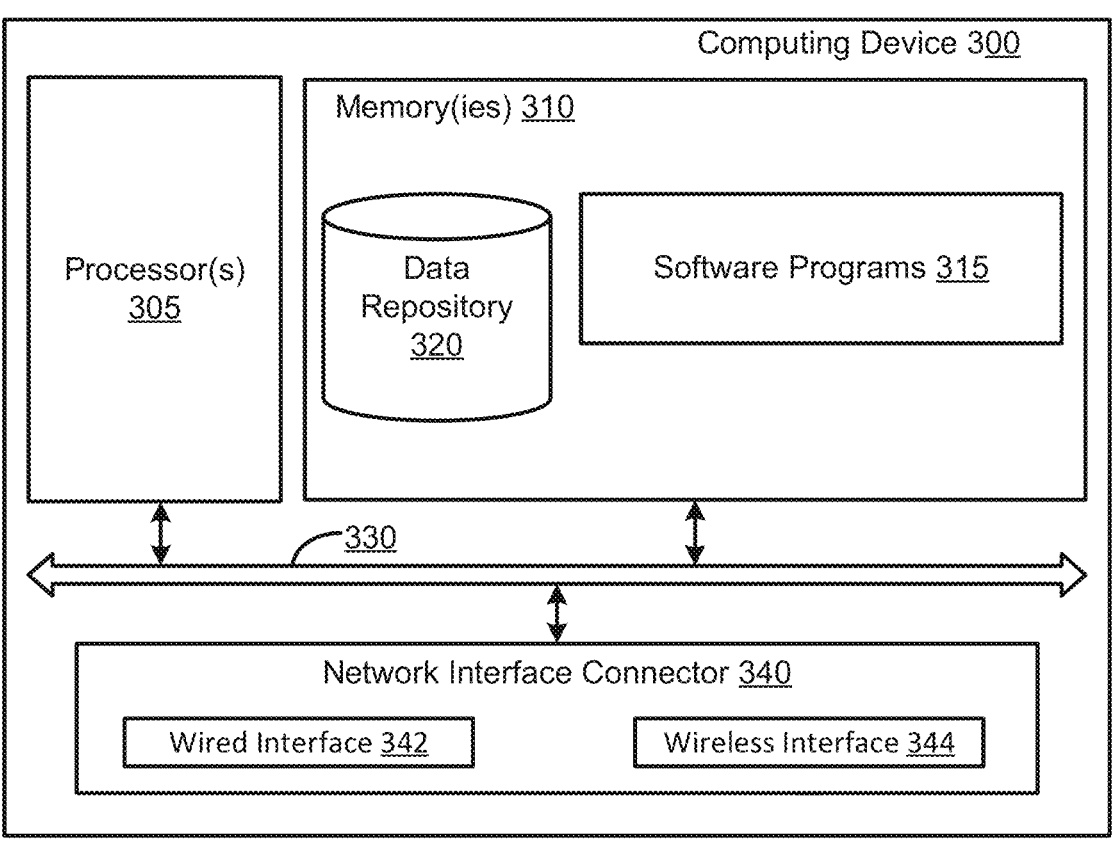
FIG. 3 illustrates an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, a software program, an application, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or main-frame, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A system, comprising:
an end-user electronic device that receives a cryptographic secret from a vault when the end-user electronic device is in close proximity to the vault, wherein the cryptographic secret is used for secure communications between a first webserver and the end-user electronic device;
a first data center comprises the first webserver that provides the cryptographic secret;
a second data center comprising a space-based vehicle transceiver that receives the cryptographic secret from the first data center over a secure communication channel, wherein the first data center and the second data center distill the cryptographic secret using a quantum key distribution protocol, and the cryptographic secret comprises a quantum key;

a first space-based vehicle that receives the cryptographic secret from the second data center over a first line-of-sight communication channel, the first space-based vehicle communicating the cryptographic secret to another space-based vehicle after determining that the first space-based vehicle does not have a line-of-sight to a third data center; and
the third data center, that receives the cryptographic secret from the another space-based vehicle over a second line-of-sight communication channel until one space-based vehicle is identified that has a line-of-sight with the third data center, encrypts data with the cryptographic secret, and communicates the encrypted data to the first data center over a communication network, wherein the third data center communicates the encrypted data to the second physical data center using asymmetric encryption including different but mathematically-related keys that are used to encrypt and decrypt;
wherein the first data center receives the encrypted data and decrypts the encrypted data using the cryptographic secret.

2. The system of claim 1, wherein the third data center communicates the encrypted data to the first data center over an Internet Protocol Security tunnel.

3. The system of claim 1, wherein the first line-of-sight communication channel and the second line-of-sight communication channel comprise Super High Frequency or Extremely High Frequency (EHF) bands.

4. The system of claim 1, wherein the secure communication channel comprises a direct fiber optic link.

5. The system of claim 1, wherein the first space-based vehicle comprises a high altitude platform system.

6. A method, comprising:
an end-user electronic device receiving a cryptographic secret from a vault when the end-user electronic device is in close proximity to the vault and using the cryptographic secret to communicate to a first webserver;
a first data center providing the cryptographic secret to a second data center over a secure communication channel,
the second data center comprising a space-based vehicle transceiver communicating the cryptographic secret to a first space-based vehicle over a first line-of-sight communication channel, wherein the first data center and the second data center distill the cryptographic secret using a quantum key distribution protocol, and the cryptographic secret comprises a quantum key,
the first space-based vehicle receiving the cryptographic secret from the space-based vehicle transceiver over a second line-of-sight communication channel, the first space-based vehicle communicating the cryptographic secret to one of a series of space-based vehicles over a second line-of-sight communication channel and along the series of space-based vehicles until one space-based vehicle of the series of space-based vehicles is identified that has a line-of-sight with the third data center,
the identified space-based vehicle of the series of space-based vehicle communicating the cryptographic secret to a third data center over a second line-of-sight communication channel,
the third data center is configured to encrypt data with the cryptographic secret, wherein the third data center communicates the encrypted data to the second physical data center using asymmetric encryption including different but mathematically-related keys that are used to encrypt and decrypt;

wherein the first data center receives the encrypted data from the third data center over a communication network; and wherein the first data center decrypts the encrypted data using the cryptographic secret.

7. The method of claim 6, wherein the third data center is configured to communicate the encrypted data to the first data center over an Internet Protocol Security tunnel.

8. The method of claim 6, wherein the first line-of-sight communication channel and the second line-of-sight communication channel comprise Super High Frequency or Extremely High Frequency (EHF) bands.

9. The method of claim 6, wherein the secure communication channel comprises a direct fiber optic link.

10. The method of claim 6, wherein the first space-based vehicle comprises a high altitude platform system.

11. A non-transitory computer readable storage medium, including instructions stored thereon, which when read and executed by one or more computer processors at a first data center, cause the one or more computer processors to perform steps comprising:

receiving a cryptographic secret from an end-user electronic device that acquires the cryptographic secret from a vault when the end-user electronic device is in close proximity to the vault;

providing the cryptographic secret to a second data center over a secure communication channel, wherein the second data center comprises a space-based vehicle transceiver and is configured to communicate the cryptographic secret to a first space-based vehicle over a first line-of-sight communication channel, wherein the first data center and the second data center distill the cryptographic secret using a quantum key distribution protocol, and the cryptographic secret comprises a quantum key, wherein the first space-based vehicle is configured to receive the cryptographic secret from the space-based vehicle over a second line-of-sight communication channel and communicate the cryptographic secret to a third data center over a second line-of-sight communication channel, wherein the third data center is configured to encrypt data with the cryptographic secret, the first space-based vehicle communicating the cryptographic secret to one of a series of space-based vehicle over a second line-of-sight communication channel and along the series of space-based vehicles until one space-based vehicle of the series of space-based vehicles is identified that has a line-of-sight with the third data center, wherein the third data center communicates the encrypted data to the second physical data center using asymmetric encryption including different but mathematically-related keys that are used to encrypt and decrypt;

receiving the encrypted data from the third data center over a communication network; and decrypting the encrypted data using the cryptographic secret.

12. The non-transitory computer readable storage medium of claim 11, wherein the first space-based vehicle comprises a high altitude platform system.

* * * * *